United States Patent [19]

Livesay et al.

[11] 4,306,753

[45] Dec. 22, 1981

[54] ARTICULATED CHAIN WITH MID-PITCH DRIVE AND REPLACEABLE DRIVE BUSHING

[75] Inventors: Richard E. Livesay; Paul L. Wright, both of Peoria, Ill.

[73] Assignee: Caterpillar Tractor Co., Peoria, Ill.

[21] Appl. No.: 90,152

[22] PCT Filed: Aug. 27, 1979

[86] PCT No.: PCT/US79/00655

§ 371 Date: Aug. 27, 1979

§ 102(e) Date: Aug. 27, 1979

[87] PCT Pub. No.: WO81/00544

PCT Pub. Date: Mar. 5, 1981

[51] Int. Cl.³ ............................................. B62D 55/20
[52] U.S. Cl. ..................................... 305/57; 305/39; 305/50; 305/14; 474/225; 474/227; 474/230
[58] Field of Search .................. 305/11, 14, 50, 54, 305/57, 58 R, 59, 39; 474/212–213, 219, 223–225, 226–232

[56] References Cited

U.S. PATENT DOCUMENTS

| | | |
|---|---|---|
| T978,007 | 1/1979 | Livesay .................................. 305/39 |
| 874,008 | 12/1907 | Holt . |
| 1,130,145 | 3/1915 | Casteran . |
| 1,186,785 | 6/1916 | Holt . |
| 1,339,786 | 5/1920 | Porter et al. . |
| 2,332,715 | 10/1943 | Herrington . |
| 2,598,828 | 6/1952 | Phelps . |
| 2,772,125 | 11/1956 | Faure et al. ............................ 305/10 |
| 3,092,423 | 6/1963 | Speidel, Jr. et al. . |
| 3,095,753 | 7/1963 | Lengyel . |
| 3,140,127 | 7/1964 | Speidel, Jr. et al. . |
| 3,359,044 | 12/1967 | Boggs .................................... 305/57 |
| 3,477,769 | 11/1969 | Thompson ............................ 305/57 |
| 3,567,294 | 3/1971 | Simpson et al. ...................... 305/57 |
| 3,601,454 | 8/1971 | Reinsma ................................ 305/11 |
| 3,680,929 | 8/1972 | Hnilicka et al. ...................... 305/57 |
| 3,860,299 | 1/1975 | Schaffner ............................. 305/57 |
| 3,955,646 | 5/1976 | Luebkemann . |
| 4,114,958 | 9/1978 | Boggs .................................... 305/56 |
| 4,159,857 | 7/1979 | Purcell .................................. 305/54 |

Primary Examiner—Charles A. Marmor
Attorney, Agent, or Firm—Oscar G. Pence

[57] ABSTRACT

An improved articulate chain (10) including pivotally interconnected sections (12,14,16) of spaced, coacting links (18,20,22) having the chain driving members (54) intermediate the pivot connections (58,60) to reduce the chain loads thereon. The links (18,20,22) are locked together in a common plane (56) by integral externally splined projections (82) extending therefrom into the internally splined drive bushing (96) to resist torque loads and increase the structural integrity of the chain (10). The links (18,20,22) are releasably coupled together to permit expeditious disassembly and reassembly thereof for servicing.

12 Claims, 3 Drawing Figures

ARTICULATED CHAIN WITH MID-PITCH DRIVE AND REPLACEABLE DRIVE BUSHING

DESCRIPTION

Technical Field

The invention relates generally to an improved articulated drive chain. More specifically, but without restriction to the use which is shown and described, this invention relates to an improved articulated drive chain for a track-type vehicle wherein the chain driving members are positioned intermediate the articulated joints, referred to as mid-pitch drive.

Background Art

Conventional articulated drive or track chains used on track-type vehicles, such as crawler tractors, include a series of spaced, side-by-side overlapping links pivotally interconnected by cooperating pins and bushings. The pins and bushings form hinged connections between adjacent chain sections so that the chain, under driving conditions, may conform to either a linear path or to a curvilinear path as it travels over the idler and the final drive sprocket. The pin and bushing connections of these prior art structures also co-act with the final drive sprocket to forcefully drive the chain.

Although such a track construction has gained wide acceptance, it is subject to several shortcomings such as cracking of the bushings due to the high impact load imposed on them by the drive sprocket. Such conventional structures are also subjected to a high rate of wear on the bushing and frictional power losses due to scrubbing action of the bushings on the sprocket. An additional drawback of the prior art structures is the excessive noise generated by the track chain and certain power losses which result from the kinematic relationship between the driving sprocket and the chain.

A further problem associated with the prior art construction arises from the manner in which the chain is assembled. The links are secured in a press fit relationship on the pin and bushing and are subjected to high stresses and chain torques due to track loads in the vicinities of the mounting bores formed therethrough. Over a period of time, these stresses cause the bores to become bellmouthed and cause excessive wear of the pin and bushing. A more serious difficulty is associated with movement of the links off the ends of the pin and bushing, a phenomenon known in the art as "link walking". The lubricant retaining seals disposed between the respective pin and bushing ends of adjacent links are effective only over a limited gap range at the interface. If the gap between adjacent links becomes too great, the resultant loss of lubricant will cause damage to the joint and a premature failure of the track chain.

Since servicing of a failed chain normally requires a hydraulic press to remove the links from the pins and bushings, a standard master link is released and the chain formed by the links is transported to a remote servicing area, minus the uncoupled track shoes. Upon completion of such servicing, such as the replacement of the seals, the links, pins, and bushings must be reassembled in their correct order to fully protect the seals. The articulated chain is then shipped back to the job site and the track assembly is reinstalled on the vehicle with the track shoes secured thereon. The above procedure not only involves substantial and uneconomical vehicle "down time", but also subjects the component parts of the chain to potential damage upon transport thereof between the job site and the servicing area.

In order to alieviate the stresses imposed on such articulated chains and the problems associated therewith, mid-pitch drive lugs have been commonly employed to engage the drive sprocket. Mid-pitch drive lugs are disclosed in U.S. Pat. No. 3,567,294 issued to Simpson et al, Mar. 2, 1971 and in U.S. Pat. No. 3,680,929 issued to Hnilicka et al, Aug. 1, 1972, both assigned to the assignee of the present invention. Mid-pitch drive lugs of this type effectively reduce the stresses imposed upon the pin and bushing assemblies and reduce wear and horsepower losses resulting from the scrubbing action of the bushings against the sprocket. However, they do not address the problems associated with chain torques, link walking, premature chain failure, and the problems associated with servicing a failed chain.

A track assembly having mid-pitch drive lugs which tie the chain links into an integral unit to resist torque loads is disclosed in U.S. Pat. No. 4,159,857 issued to Purcell, July 3, 1979, also assigned to the assignee of the present invention. However, this track assembly does not address the service problems heretofore discussed.

In view of the above, it would be advantageous to provide an articulated chain having integral midpitch drive lugs which tie the chain links into an integral unit structurally superior to and lighter than conventional chain, being less costly to assemble, and readily serviceable.

DISCLOSURE OF THE INVENTION

In one aspect of the present invention, the problems pertaining to the known prior art, as set forth above, are advantageously avoided. This is accomplished by providing an articulated chain including a plurality of pivotally interconnected pairs of spaced, side-by-side, coacting links having first and second pivot axes, the links being releaseably secured together into an integral unit and further including a drive element intermediate the pivot axes.

This invention therefore provides an articulated chain which exhibits a high degree of structural integrity and long service life while yet providing for the expeditions disassembly thereof for servicing purposes.

BRIEF DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein.

BEST MODE FOR CARRYING OUT THE INVENTION

Figure 1:
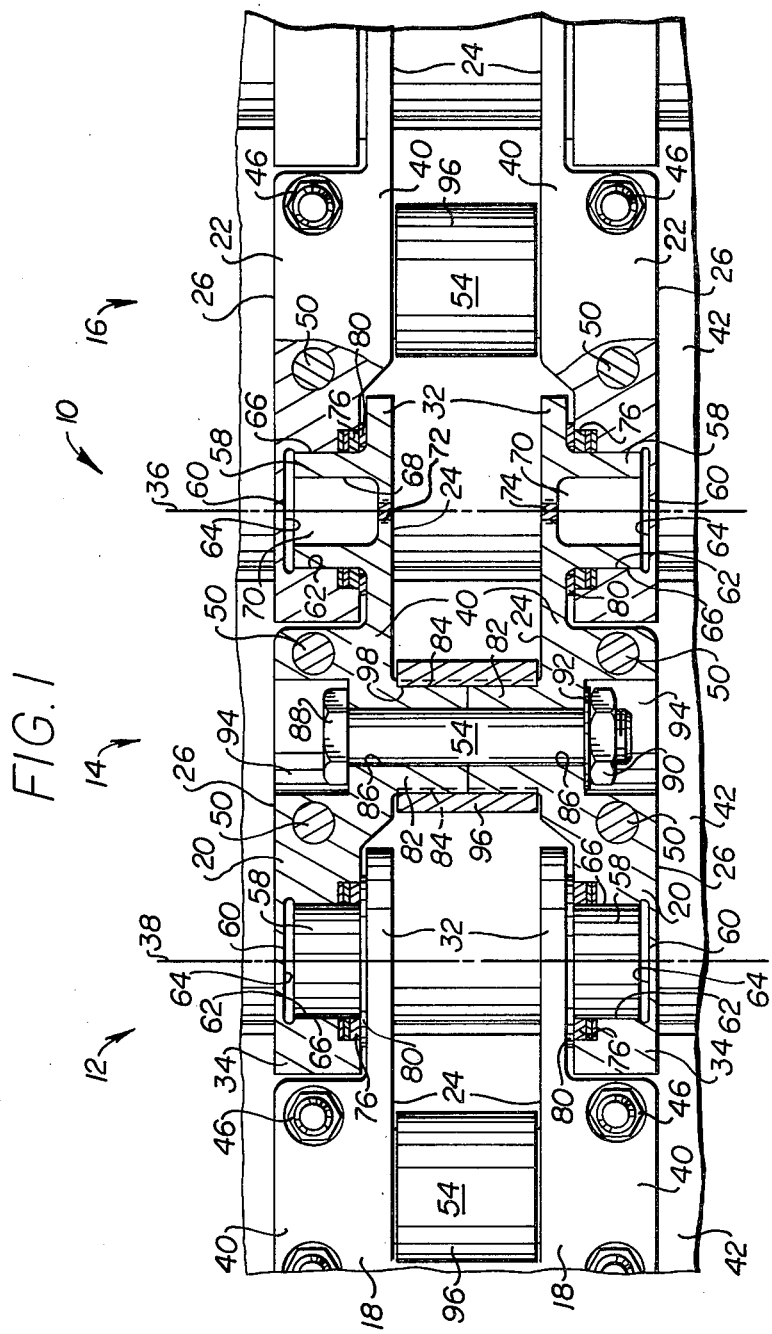
FIG. 1 is a vertical elevational view of a portion of an articulated chain embodying the present invention.
Figure 2:
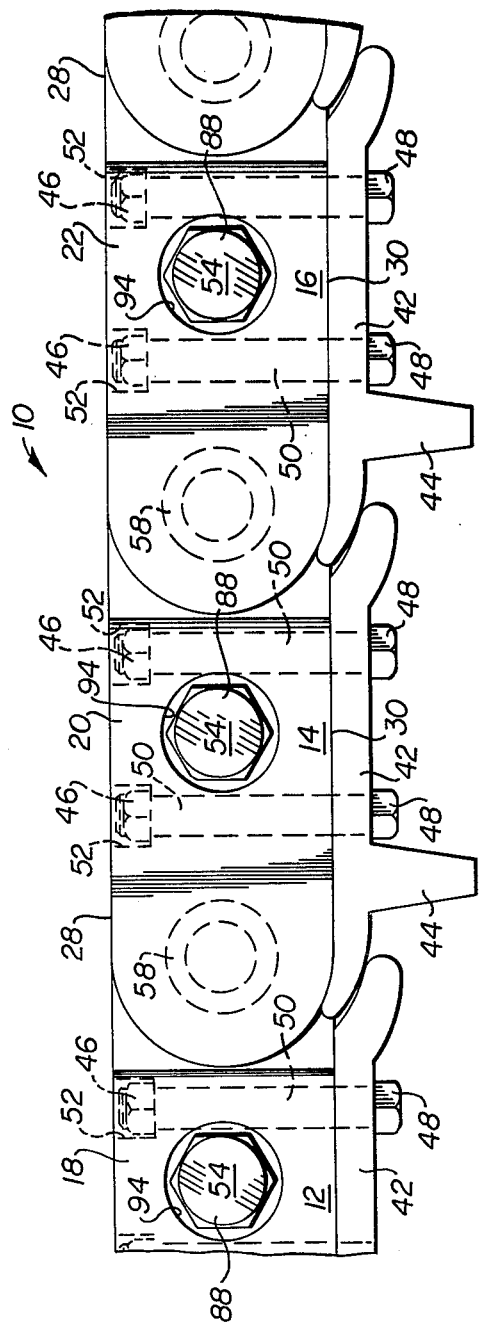
FIG. 2 is a horizontal profile view of a portion of an articulated chain embodying the present invention with portions removed to better illustrate the components thereof.

FIGS. 1 and 2 illustrate a portion of one preferred embodiment of an improved articulated chain 10 constructed in accordance with the present invention. The chain includes a plurality of pivotally interconnected sections 12,14,16, each having a pair of spaced, side-by-side, coacting links 18,20,22. Each link individually has an inner and an outer surface 24,26, upper and lower substantially parallel rail surfaces 28,30, first and second end portions 32,34 having first and second pivot axes 36,38 extending respectfully therethrough, and a middle portion 40. A track shoe 42 having the usual grouser 44 extends across each chain section and is secured to the lower rail surfaces of each of the links thereof by suitable fastening means, for example, the nuts 46 threadably secured to the bolts 48, or the like. The bolts are disposed in a respective opening or passage 50 extending perpendicularly between the upper and lower rail surfaces. In the embodiment shown, a counter bore 52 is provided coaxially with each passage for receiving the nuts therein to facilitate smooth operation of the chain. Advantageously, each section further includes means 54 intermediate the link pivot axes for releasably coupling the links together, for locking them in a common plane 56, and for drivingly engaging a final drive sprocket (not shown).

Figure 3:
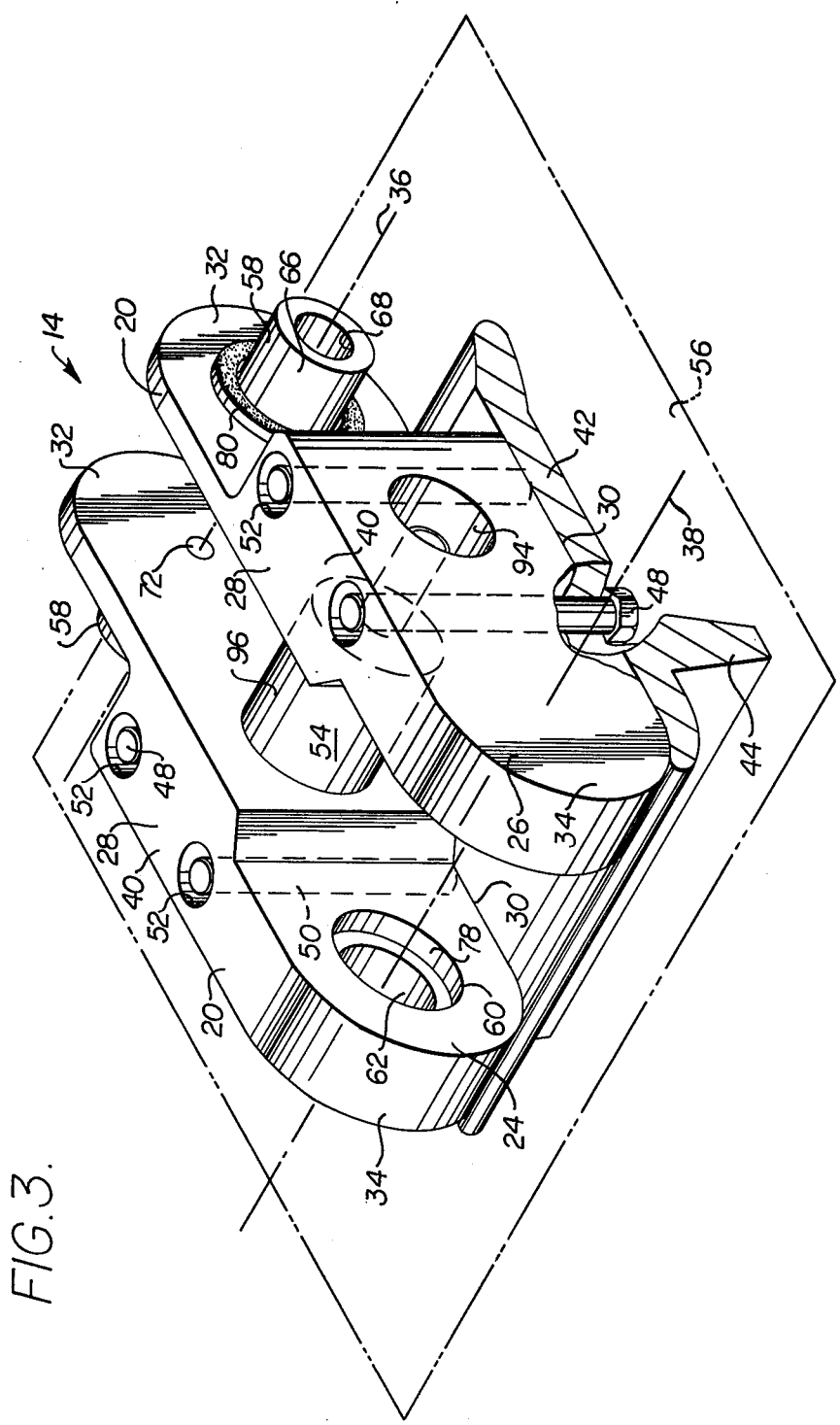
FIG. 3 is an isometric view in partial section of an embodiment of the present invention.

As further illustrated in FIG. 1 and shown in greater detail in FIG. 3, the first end portion 32 of each of the links 18,20,22 has a male pivotal connection or boss 58 extending coaxially outwardly from the outer link surface 26 along the first pivot axis 36. The second end portion 34 of each of the links includes a female pivotal connection or an inwardly extending blind bore (60) defined in part by a cylindrical bore 62 and an end face portion 64 perpendicular thereto and facing coaxially outwardly from the inner link surface 24 along the second pivot axis 38. As best illustrated in FIG. 1, each male pivotal connection or boss has a cylindrical bearing surface 66 received in the blind bore of an adjacent link and cooperating therewith to pivotally interconnect the link sections. The links have a stepped configuration which permits overlapping of the first and second ends of the adjacent links permitting articulation therebetween.

The cylindrical bore 62 and the end face portion 64 of each of the female pivotal connections 60 cooperate with a cavity 68 defined by each male pivotal connection 58 facing outwardly from the outer link surface 26 in forming a lubricant-receiving reservoir or cavity 70 for supplying lubricant to the pivotal connections. A lubricant receiving opening or passage 72 in the inner surface 24 of each link communicates lubricant to the cavity 70, and a plug or stopper 74 prevents loss of lubricant therefrom. A seal 76 disposed in an annular recess 78 formed circumferentially about each cylindrical bore and in sealing engagement with an annular seal face 80 secured to the outer link surface immediately adjacent each cylindrical bearing surface 66 prevents egress of lubricant from the pivotal connections or ingress of dirt and other contaminants therein.

The middle portion 40 of each of the links 18,20,22 has a projection 82 extending inwardly from the inner link surface 24 which, by way of illustration, is in the form of a cylindrical boss having external splines 84 as shown on each of the links 20 in FIG. 1. An opening or bore 86 extending from the outer link surface 26 through the projection is adapted to receive fastening means, for example, a threaded bolt 88 secured by a nut 90 and a washer 92, for releasably coupling the links of each chain section 12,14,16 together. The outer surface of each link contains a counter bore 94 coaxially aligned with the bore 86 for receiving either the end of a bolt or a nut. It is to be understood that according to the preference of one practicing the invention, the bolts may be advantageously assembled into each chain section from either side without departing from the invention.

A mid-pitch drive bushing 96 having internal splines 98 is received over the projections extending from the links 18,20,22 of each chain section 12,14,16. The internal splines of the bushing mateably engage the external splines 84 of the projections in such a manner that the links are locked together in a common plane 56.

As hereinbefore set forth, each chain section includes means 54 intermediate the pivot axes 36,38 for releasably coupling the links together, for locking them in a common plane 56, and for drivingly engaging a final drive sprocket. From the foregoing it will be seen that at the link middle portions 40, the externally splined, inwardly extending projections 82, the internally splined mid-pitch drive bushing 96, the threaded bolt 88, and the nut 90 and washer 92 are so constructed and arranged that the above-named features are provided in an easily assembled track chain of relatively simple construction.

Industrial Applicability

With the various elements assembled as set forth above, in operation of the articulated track chain 10 the teeth of the final drive sprocket (not shown) will engage the mid-pitch drive bushing 96 intermediate the pivot axes 36,38 between the adjacent chain sections 12,14,16. The high impact loads and bushing wear caused by scrubbing normally experienced in prior art chains at the pivot connections 58,60 are substantially reduced, and the problems associated with "link walking", the loss of lubricant, and premature chain failure are eliminated. The combined effect of the mating splined bushing 96, the inwardly extending splined projections 82 at the link middle portions 40, and the forces exerted thereon by the bolt 88, the nut 90, and the washer 92 releasably holding the links together ties the links together in a unit structurally superior to conventional chain.

In normal operation of the chain 10, the bushings 96, the seals 76, and individual links 18,20,22 will require periodic replacement or repair. Expeditious disassembly of the chain is achieved by uncoupling the master links detaching the appropriate track shoes 42 from the chain and sequentially disassembling each section up to the damaged element. Since the chain of the present invention is free from the press fit connections found in conventional chains, a press is not required for its disassembly and reassembly. The individual elements may be advantageously serviced as necessary at the job site without transporting it to and from a remote location, thus reducing downtime and further enhancing the economical aspects of the chain of this invention.

It should be noted that whereas, individual seals 76 and links 18,20,22 may have to be replaced, each mid-pitch drive bushing 96 may be rotated 90° and reinstalled in the chain to expose an unworn portion thereof to contact with the final drive sprocket teeth, a feature which further increases the economical aspects of the articulated chain of this invention. In addition, this can be done without opening the joint to contamination by temporarily clipping the links on each side together during the bushing turn.

Other aspects, objects, and advantages of this invention can be obtained from a study of the drawings, the disclosure, and the appended claims.

I claim:

1. An articulated chain (10) including a plurality of pivotally interconnected sections (12,14,16), each section (12,14,16) having a pair of spaced, side-by-side, coacting links (18,20,22), said links (18,20,22) being independently pivotally connected about first and second pivot axes (36,38) to respective ones of the links of adjoining sections (12,14,16), the chain (10) being engaged with a sprocket, wherein the improvement comprises:
   means (54) for releasably coupling said links (18,20,22) together, for locking the links together in a common plane (56) and for drivingly engaging the sprocket, said means (54) being positioned intermediate the pivot axes (36,38) and including spline means (98,84) for non-rotatably locking said pair of links (18,20,22) in said common plane 56.

2. The chain (10) of claim 1 wherein said means (54) includes:
   an inwardly extending projection (82) on each of said links (18,20,22), said projections (82) being intermediate the first and second pivot axes (36,38);
   a member (96) interconnecting each of said inwardly extending projections (82); and
   said splines means includes an external spline (84) on each of said inwardly extending projections (82) and an internal spline (98) on said member (96), said internal spline being in mating engagement with each of said external splines (84).

3. The chain (10) of claim 2 wherein said means (54) further includes:
   an opening (86) extending through each of said inwardly extending projections (82); and
   second means (88,90,92) disposed in each of said openings (86) for releasably coupling said links (18,20,22) together.

4. The chain (10) of claim 2 wherein said interconnecting member (96) is in the form of a replaceable bushing (96) receiving said projections (82).

5. The chain (10) of claim 3 wherein said second coupling means (88,90,92) comprises a threaded bolt (88) secured by a nut (90) and a washer (92).

6. The chain (10) of claim 5 wherein each of said links (18,20,22) includes an inner and an outer surface (24,26), each of said outer surfaces (24,26) further including a counter bore (94) aligned substantially coaxially with said openings (86) in said opposed projections (82) for receiving a portion of said bolt (83), said nut (90), and said washer (92).

7. The chain (10) of claim 1 wherein said means (54) includes:
   a substantially opposed and aligned projection (82) having an opening (86) on each of said links (18,20,22) extending inwardly a preselected distance therefrom;
   fastening means (88,90,92) extending through said openings (86) for releasably securing said links (18,20,22) together;
   a bushing (96) disposed intermediate said links (18,20,22), said bushing (96) receiving at least a portion of each of said projections (82); and
   said spline means initiates internal and external splines (98,84) provided on said bushing (96) and said projections (82), respectively, said splines (98,84) mateably engaging one another for locking the links (18,20,22) together in a common plane (56).

8. An articulated chain (10) including a plurality of pivotally interconnected sections (12,14,16), each section having a pair of spaced, side-by-side, coacting links (18,20,22) and a mid pitch drive bushing (96) disposed between said pair of links (18,20,22), wherein the improvement comprises:
   means (54) for locking and maintaining said pair of links (18,20,22) together in a common plane (56), said means including internal and external splines (98,84) mateably engaging one another, said splines (98,84) being cooperatively positioned on respective ones of said links (18,20,22) and bushing (96).

9. The chain of claim 8 wherein said means (54) includes:
   an inwardly extending projection (82) provided on each of said links (18,20,22) in opposed relationship to each other, each projection having said external spline (84) thereon; and
   said bushing (96) being disposed about said projections and having said internal spline (98), said internal spline being mateably engagable with the external splines (84) on each of said projections (82).

10. The chain (10) of claim 9 wherein said means (54) further includes:
    means (88,90,92) for releasably coupling said links (18,20,22) together.

11. The chain (10) of claim 10 wherein each of said projections (82) includes a central opening extending therethrough and wherein said coupling means (88,90,92) includes a threaded bolt (88) disposed through said opening, said bolt being secured by a nut (90) and a washer (92).

12. The chain (10) of claim 11 wherein each of said links (18,20,22) includes an outer surface (26), each of said surfaces (26) having a counterbore (94) in substantial coaxial alignment with said openings (86) in said projections (82) for receiving a portion of said bolt (83), nut (90) and washer (92).

* * * * *